(12) United States Patent
Quiram et al.

(10) Patent No.: US 8,167,011 B2
(45) Date of Patent: *May 1, 2012

(54) PORTABLE WORK BENCH

(75) Inventors: Ronald Quiram, Phoenix, MD (US); Adan Ayala, Joppa, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,642

(22) Filed: Sep. 16, 2010

(65) Prior Publication Data

US 2011/0000581 A1  Jan. 6, 2011

Related U.S. Application Data

(63) Continuation of application No. 12/416,372, filed on Apr. 1, 2009, now Pat. No. 7,814,947, which is a continuation of application No. 11/376,963, filed on Mar. 16, 2006, now Pat. No. 7,530,377, which is a continuation of application No. 10/835,813, filed on Apr. 30, 2004, now Pat. No. 7,048,021, which is a continuation of application No. 10/449,270, filed on May 30, 2003, now Pat. No. 6,748,987, which is a continuation of application No. 10/151,507, filed on May 20, 2002, now Pat. No. 6,595,251, which is a continuation of application No. 09/760,386, filed on Jan. 12, 2001, now Pat. No. 6,415,831, which is a continuation of application No. 09/357,500, filed on Jul. 20, 1999, now Pat. No. 6,199,608, which is a continuation of application No. 09/207,355, filed on Dec. 8, 1998, now Pat. No. 5,988,243, which is a continuation-in-part of application No. 08/899,937, filed on Jul. 24, 1997, now Pat. No. 5,875,828.

(60) Provisional application No. 60/070,501, filed on Jan. 6, 1998.

(51) Int. Cl.
*B25H 1/00* (2006.01)

(52) U.S. Cl. .................. 144/286.1; 144/286.5; 144/287; 182/181; 269/901

(58) Field of Classification Search ....... 144/286.1–287; 83/471, 474; 182/181.1, 182.1, 183.1, 186.1; 269/289 R, 901, 291

See application file for complete search history.

(56) References Cited

U.S. PATENT DOCUMENTS

| | | | | |
|---|---|---|---|---|
| 5,320,150 | A * | 6/1994 | Everts et al. | 144/287 |
| 5,836,365 | A * | 11/1998 | Derecktor | 144/287 |
| 5,988,243 | A * | 11/1999 | Ayala et al. | 144/329 |
| 6,029,721 | A * | 2/2000 | O'Banion | 144/287 |
| 6,199,608 | B1 * | 3/2001 | Ayala et al. | 144/286.1 |
| 6,415,831 | B2 * | 7/2002 | Ayala et al. | 144/286.1 |
| 6,595,251 | B2 * | 7/2003 | Ayala et al. | 144/286.1 |
| 6,748,987 | B2 * | 6/2004 | Ayala et al. | 144/286.5 |
| 7,048,021 | B2 * | 5/2006 | Ayala et al. | 144/287 |
| 7,530,377 | B2 * | 5/2009 | Ayala et al. | 144/286.5 |
| 7,814,947 | B2 * | 10/2010 | Ayala et al. | 144/286.1 |

* cited by examiner

*Primary Examiner* — Shelley Self
(74) *Attorney, Agent, or Firm* — Adan Ayala

(57) ABSTRACT

An improved portable work bench includes a structural body, and a platform disposed on and frictionally contacting the structural body. In addition, the platform includes an override mechanism for allowing horizontal movement of the platform along the structural body. Further, the portable work bench may include a plurality of legs for supporting the structural body. The structural body may be tubular and preferably has a trapezoidal cross-section. Such work bench can be used by disposing the platform on the structural body, so that the platform frictionally contacts the structural body. Then the user can mechanically override the static friction between the platform and the structural body and move the platform horizontally along the structural body.

16 Claims, 9 Drawing Sheets

PORTABLE WORK BENCH

CROSS-REFERENCE TO RELATED APPLICATIONS

This application is a continuation of U.S. patent application Ser. No. 12/416,372, filed Apr. 1, 2009, now U.S. Pat. No. 7,814,947, which is in turn a continuation of U.S. patent application Ser. No. 11/376,963, filed Mar. 16, 2006, now U.S. Pat. No. 7,530,377, which is in turn a continuation of U.S. patent application Ser. No. 10/835,813, filed Apr. 30, 2004, now U.S. Pat. No. 7,048,021, which is in turn a continuation of U.S. patent application Ser. No. 10/449,270, filed May 30, 2003, now U.S. Pat. No. 6,748,987, which is in turn a continuation of U.S. patent application Ser. No. 10/151,507, filed May 20, 2002, now U.S. Pat. No. 6,595,251, which is in turn a continuation of U.S. patent application Ser. No. 09/760,386, filed Jan. 12, 2001, now U.S. Pat. No. 6,415,831, which in turn is a continuation of U.S. patent application Ser. No. 09/357,500, filed Jul. 20, 1999, now U.S. Pat. No. 6,199,608, which is in turn a continuation of U.S. patent application Ser. No. 09/207,355, filed on Dec. 8, 1998, now U.S. Pat. No. 5,988,243, which in turn is a continuation-in-part of U.S. patent application Ser. No. 08/899,937, filed on Jul. 24, 1997, now U.S. Pat. No. 5,875,828. Application Ser. No. 09/207,355 also derives priority from U.S. Application No. 60/070,501, filed Jan. 6, 1998, now abandoned.

FIELD OF THE INVENTION

This invention relates generally to work benches and more particularly to a portable work bench that can support a power tool and a workpiece.

BACKGROUND OF THE INVENTION

It is common in the construction industry for users to bring their power tools to the work site. Thus, the users require a work surface at the work site to support the power tools for use. Preferably the work surface is at a certain height so that the user can comfortably use the power tool. In addition, the work surface should also be sufficiently portable to be easily moved around a work site.

In the past, users have disposed their power tools on sheets of wood which are in turn supported by two or more sawhorses. This arrangement, however, lacks the strength for efficient operation, as well as being difficult to move around the work site.

Accordingly, different support stands or work benches have been proposed in order to provide a portable work surface that can support a power tool. Some of these prior art solutions have been described in U.S. Pat. Nos. 1,864,840, 4860,807, 4,874,025, 4,974,651, 5,193,598, and 5,421,231. However, these prior art solutions do not provide a platform supporting the power tool which can be moved horizontally so that the power tool can be moved without moving the workpiece.

Other prior art solutions, such as the one described in U.S. Pat. No. 5,592,981, provide a platform supporting the power tool which can be moved horizontally so that the power tool can be moved without moving the workpiece. However, they require that the user insert and slide the platform from the end of the workbench towards the desired position on the workbench.

SUMMARY OF THE INVENTION

In accordance with the present invention, an improved portable work bench is employed. The portable work bench includes a structural body, and a platform disposed on and frictionally contacting the structural body. In addition, the platform includes an override mechanism for allowing horizontal movement of the platform along the structural body. Further, the portable work bench may include a plurality of legs for supporting the structural body. The structural body may be tubular and preferably has a trapezoidal cross-section.

Such work bench can be used by disposing the platform on the structural body, so that the platform frictionally contacts the structural body. Then the user can mechanically override the static friction between the platform and the structural body and move the platform horizontally along the structural body.

Another embodiment of the present invention discloses a portable work bench, which includes a structural body, and a platform disposed on the structural body. In addition, the platform includes a cam mechanism for locking the position of the platform along the structural body. Further, the portable work bench may include a plurality of legs for supporting the structural body. The structural body may be tubular and preferably has a square cross-section.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
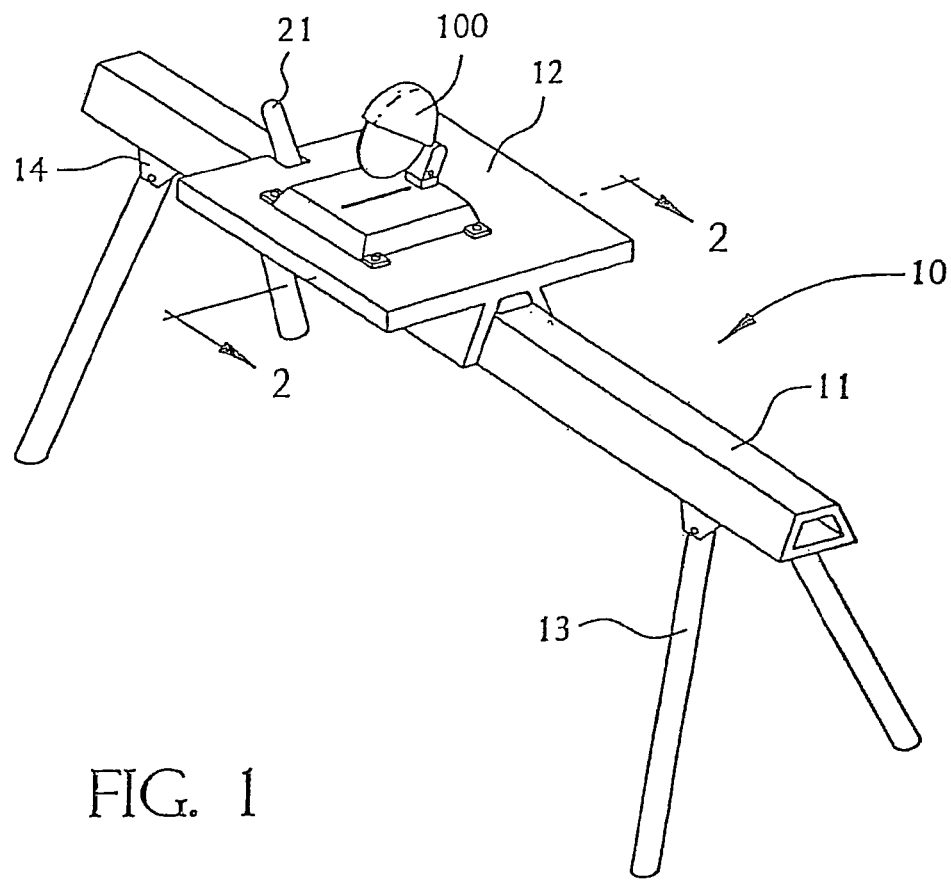
FIG. 1 is a perspective view of a first embodiment of a portable work bench of the present invention.

The invention is now described with reference to the accompanying figures, wherein like numerals designate like parts. Referring to FIG. 1, a portable work bench 10 of the present invention is shown carrying a chop saw 100. However, persons skilled in the art will recognize that the work bench 10 can support any power tool, such as a sliding compound miter saw, a drill press, a table saw, etc., any hand tools, or anything else that needs to be supported.

The work bench 10 has a structural body 11 and a platform 12 disposed on and frictionally contacting the structural body 11. In addition, the work bench 10 may have legs 13 for supporting the structural body 11 and platform 12. The legs 13 may be connected to the body 11 via brackets 14 as is well known in the art. Persons skilled in the art are referred to U.S. Pat. Nos. 4,605,099 and 5,592,981, which disclose exemplary means for providing foldable legs for the work bench. However, persons skilled in the art will know that fixed legs which do not fold will also function properly.

Figure 2:
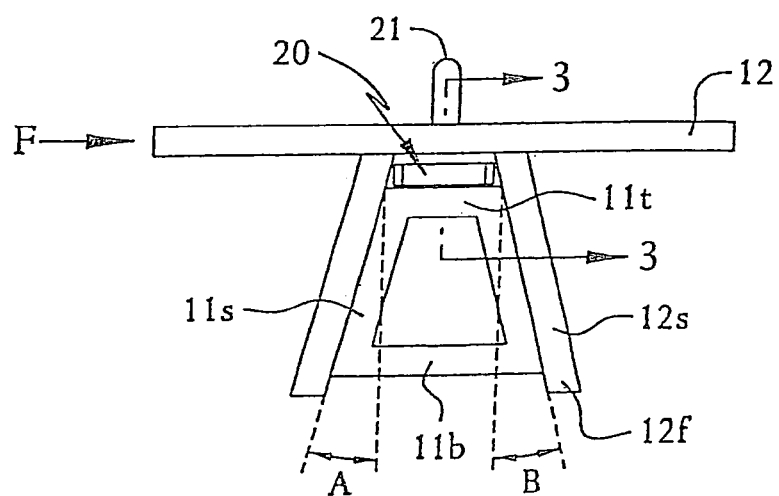
FIG. 2 is a cross-sectional side view of the work bench along line 2-2 of FIG. 1.

Referring to FIG. 2, the structural body 11 is preferably tubular so that it can withstand substantial amounts of torsional and lateral loads applied thereto. Furthermore, the cross-section of the structural body 11 is preferably trapezoidal, that is, the top 11t and bottom 11b surfaces of the body 11 are parallel to each other. The side surfaces 11s can be parallel to each other, but are not required to. Preferably, the side surfaces 11s are angled in relation to the top 11t and bottom 11b surfaces. One side surface may be at an angle A relative to the top 11t and bottom 11b surfaces, while the other side surface may be at an angle B relative to the relative to the top 11t and bottom 11b surfaces. Preferably both angles A and B are equal and could be between 0° and 15°, where the preferred range is 3° to 4°.

The platform 12 is preferably designed to receive a power tool 100 thereon in the manner well known in the art. As mentioned above, the platform 12 is disposed on and frictionally contacts the structural body 11. As seen in FIG. 2, the side surfaces 12s of the platform 12 contact the side surfaces 11s of the body 11. Once the power tool 100 is placed on the platform 12, the frictional contact will hold the platform 12 on the body 11, as well as maintain the location of the platform 12 along the body 11. In other words, because of the frictional contact between the platform 12 and the body 11, a user may not be able to easily move the platform 12 along the body 11. In addition, if the body 11 has a trapezoidal cross-section, the platform 12 may stay on the body 11 when a sideways force F is applied on the platform, without requiring a separate lock assembly to hold the platform in place.

It is also preferable to provide respective flat foot portions 12f on the platform side surfaces 12s. This enables a user to lift up the platform 12 and use the platform on a table or other flat surface, if desired.

The platform 12 may also have an override mechanism 20. This override mechanism 20 allows the user to move the platform 12 along the length of the structural body 11. FIGS. 3, 4, 5, and 6 show different override mechanisms to accomplish this purpose. All of these override mechanisms lift the platform 12 so that the platform side surfaces 12s do not contact the body side surfaces 11s. Because the frictional contact is reduced, the user can then roll or slide the platform to the desired position using less force than before.

Figure 3A:
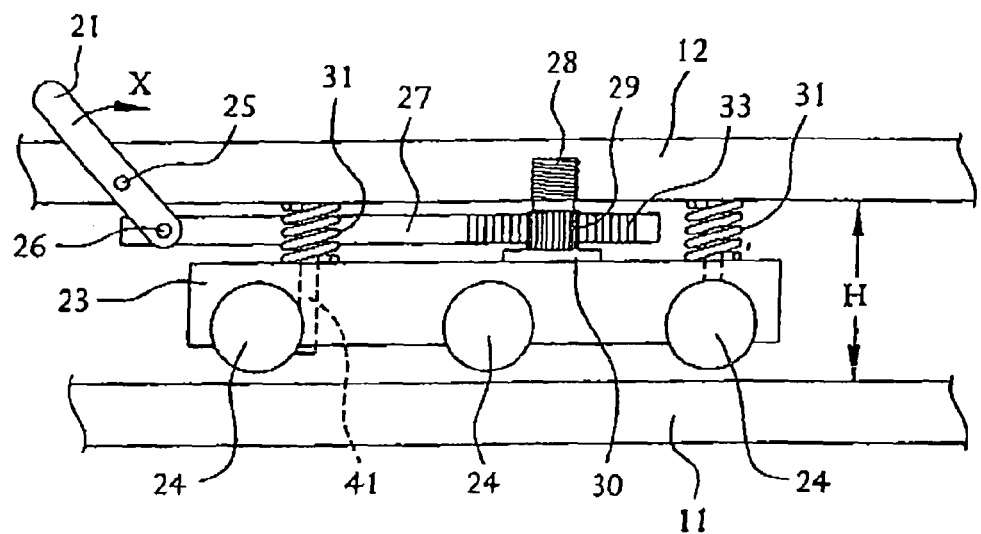
FIGS. 3A and 3B are cross-sectional front views of the work bench along line 3-3 of FIG. 2, showing a first override mechanism.
Figure 3B:
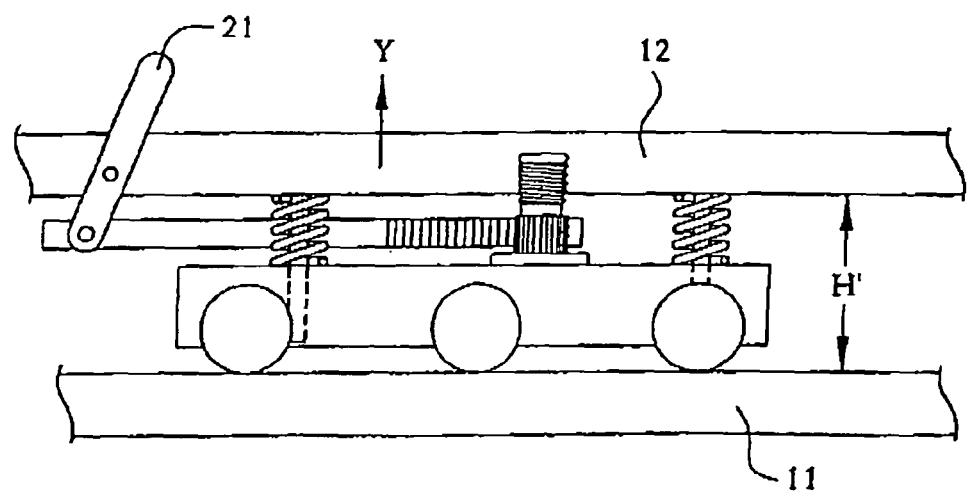
Figure 4A:
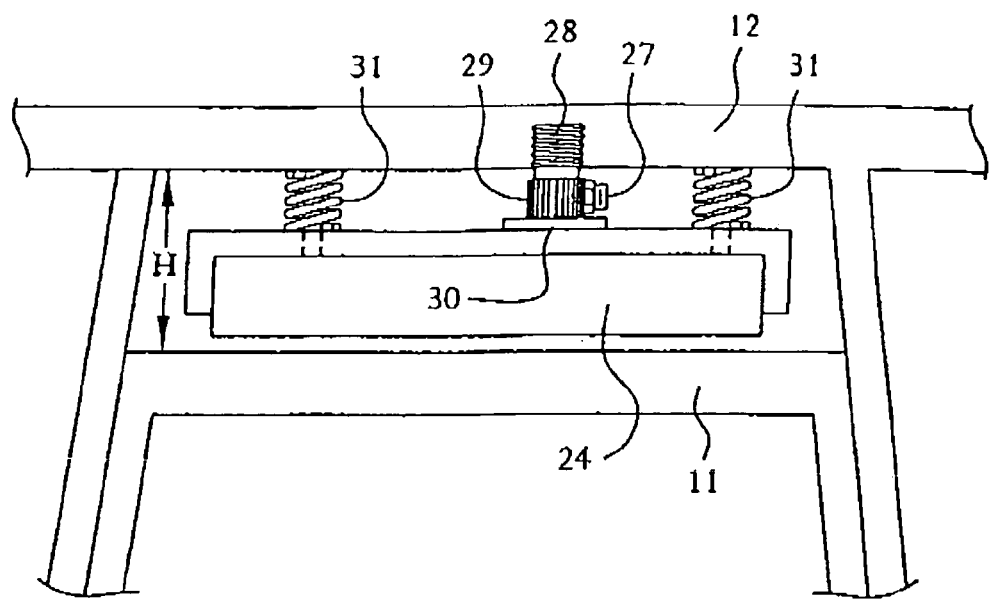
FIGS. 4A and 4B are detailed cross-sectional side views of the work bench along line 2-2 of FIG. 1.
Figure 4B:
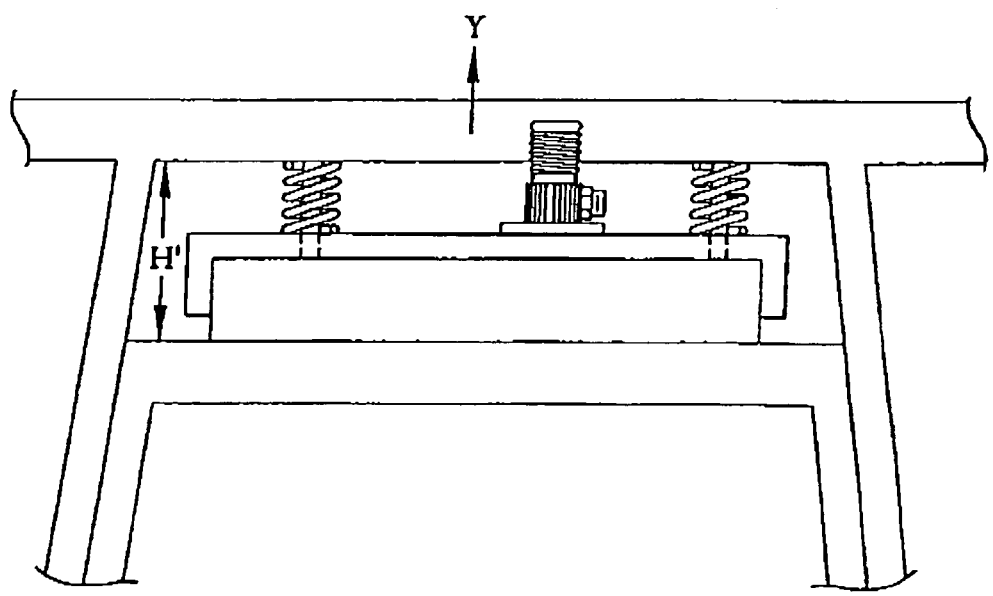

Referring to FIGS. 3 and 4, a carriage 23 is disposed under the platform 12. The carriage 23 may have rollers 24 rotatably attached thereto. Persons skilled in the art will realize that other friction reducing mechanisms, such as ball bearings, may be used instead. As seen in FIGS. 3A and 4A, the rollers 24 do not touch the structural body 11. Furthermore, the carriage 23 is preferably connected to the platform 12 via springs 31, which pull the carriage 24 towards the platform 12.

A threaded shaft 28 is threadedly engaged to the platform 12. The shaft 28 may in turn have a pad 30, which contacts the carriage 23. Further, the shaft 28 may have a pinion 29, which in turn engage the rack 33 of rod 27.

The override mechanism 20 may have a lever 21 pivotally attached to both the platform 12 (via pin 25) and to the rod 27 (via pin 26). Accordingly, when the user moves the lever 21 in a clockwise direction X, the lever 21 pivots about pin 25, pulling rod 27. As the rod 27 is pulled, the rack 33 and pinion 29 combination cause the shaft 28 to rotate. As the shaft 28 rotates, it screws out of platform 12, pushing carriage 23 downward. As the carriage 23 moves downward, the rollers 24 contact the structural body 11. Then the platform 12 begins to rise along direction Y, until a gap is created between the platform side surfaces 12s and the structural body side surfaces 11s (see FIG. 4B).

Because the platform side surfaces 12s and the structural body side surfaces 11s do not contact each other, no friction exists between them. A user can then easily move the platform 12 along the structural body 11 by pushing the platform 12. Because the rollers 24 contact the structural body 11, less force is required to move the platform 12 than before, as the coefficient for rolling friction is smaller than the coefficient for sliding friction.

Once the platform 12 has been moved to the appropriate location, the user can rotate the lever 21 in a counterclockwise direction. This causes the carriage 23 to return to the original, retracted position, in turn lowering the platform 12 until the platform side surfaces 12s and the structural body side surfaces 11s contact each other.

In order to ensure that the carriage 23 does not move sideways or rotate when the lever 21 is rotated, it is preferable to slidably dispose the carriage 23 on rods 41, which are fixedly attached to the platform 12. The rods 41 ensure that the carriage 23 only moves up and down.

Figure 5A:
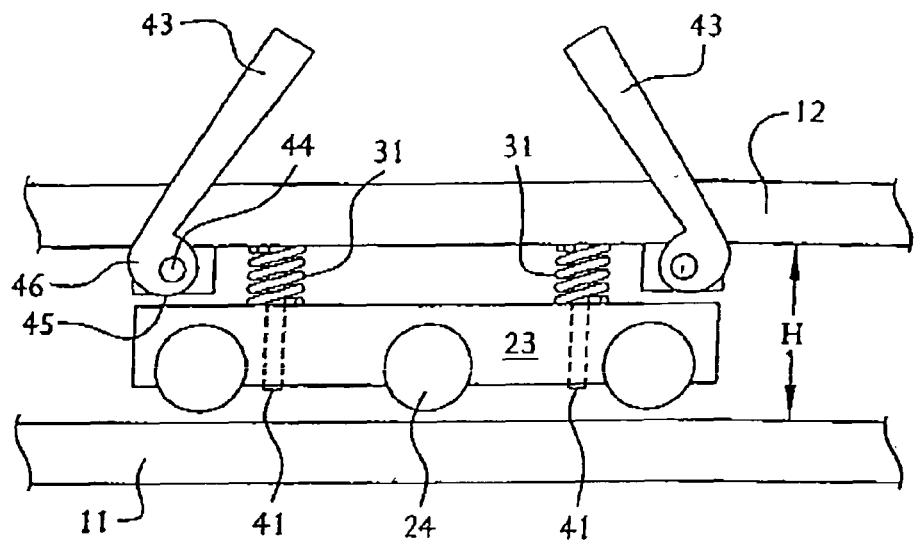
FIGS. 5A and 5B are cross-sectional front views of the work bench along line 3-3 of FIG. 2, showing a second override mechanism.
Figure 5B:
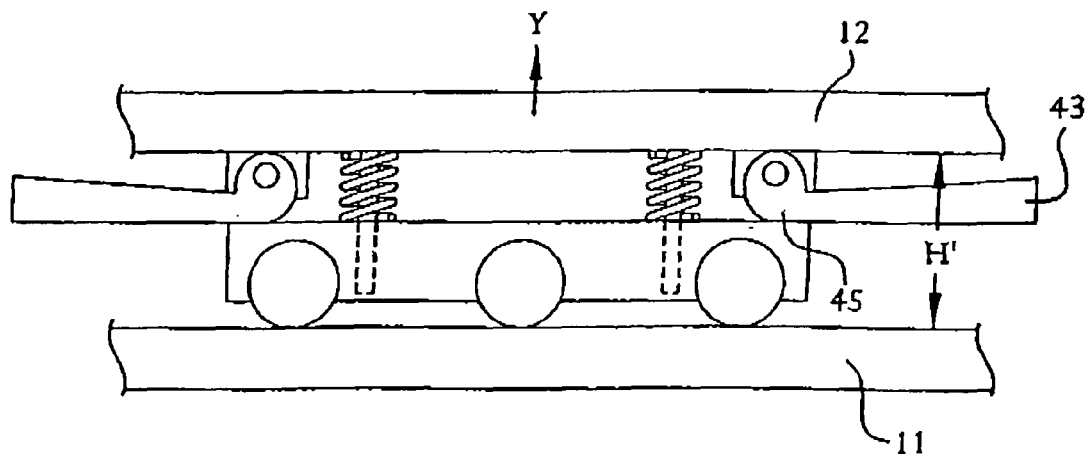

A second embodiment of the override mechanism 20 is shown in FIG. 5. As described above, the override mechanism 20 may preferably have a carriage 23 with rollers 24 rotatably attached thereto. In addition, the carriage 23 may be slidably disposed on rods 41, which are fixedly attached to the platform 12. In addition, springs 31 preferably bias the carriage 23 towards the platform 12.

Unlike in the previous embodiment, cams 46 are used to move the carriage 23 downward. The cams 46 are pivotally attached to the platform 12 and rotate about pin 44. The cams also have camming surfaces 45 and levers 43. When the user pivots the cams 46 via the levers 43, the camming surfaces 45 contact and urge the carriage 23 downwardly, so that the rollers 24 contact the structural body 11 and lift the platform 12 therefrom. In order to lower the platform 12, the user need only to rotate the levers 46 in the opposite direction.

Figure 6A:
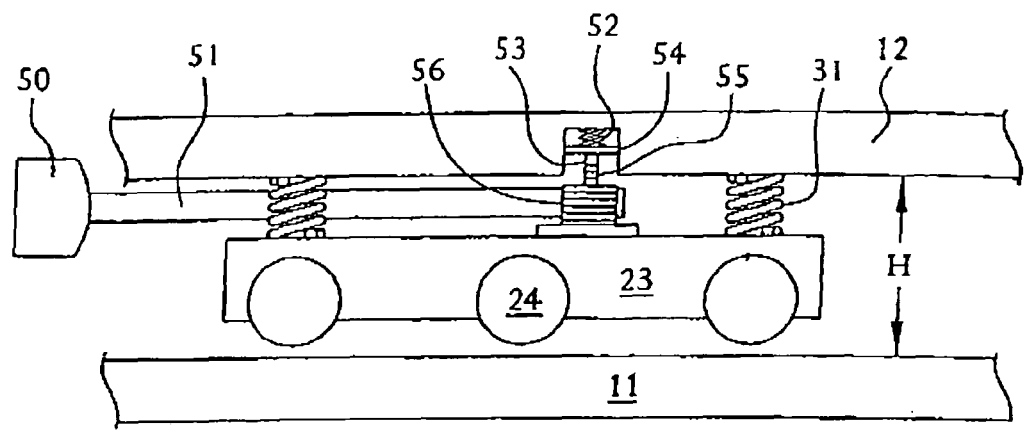
FIGS. 6A and 6B are cross-sectional front views of the work bench along line 3-3 of FIG. 2, showing a third override mechanism.
Figure 6B:
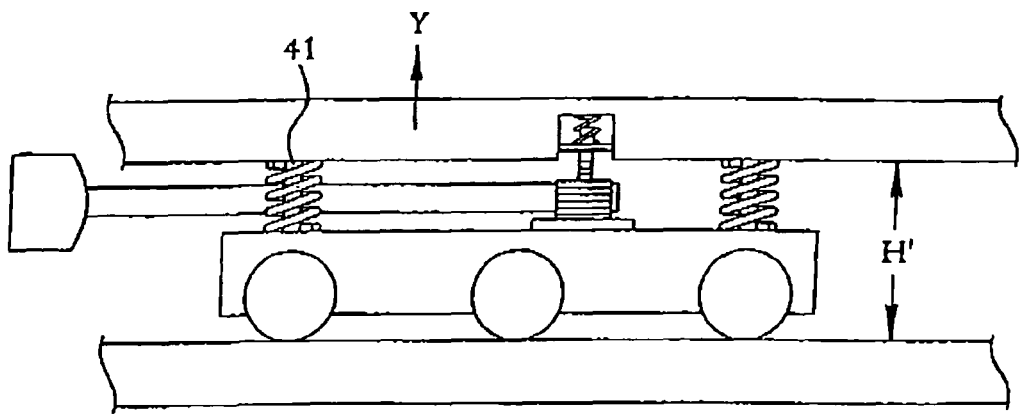

A third embodiment of the override mechanism 20 is shown in FIG. 6. As described above, the override mechanism 20 may preferably have a carriage 23 carrying rollers 24 rotatably attached thereto. In addition, the carriage 23 may be slidably disposed on rods 41, which are fixedly attached to the platform 12. In addition, springs 31 preferably bias the carriage 23 towards the platform 12.

Unlike in the previous embodiments, a rod 51 is rotated via knob 50 in order to move the carriage 23 along rods 41. Rod 51 has a pinion 56 disposed thereon. Pinion 56 in turn meshes with a rack 55 provided on a shaft 53. Once the knob 50 is rotated, the rack 55 and pinion 56 mesh, causing the shaft 53 to move downwardly. The shaft 53 then moves the carriage 23 downwardly. Preferably, a spacer 54 is provided in the platform 12 to ensure that the shaft 53 will only move vertically. Further, it is also preferable to provide a spring 52 which biases the shaft 53 towards the platform 12.

Figure 7:
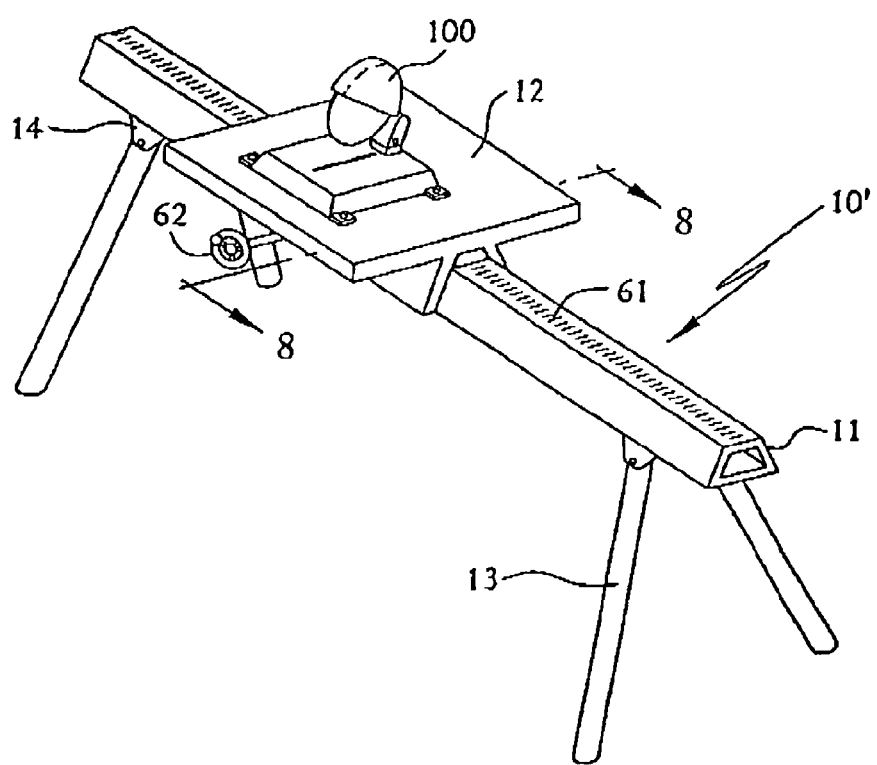
FIG. 7 is a perspective view of a second embodiment of a portable work bench of the present invention.

Referring to FIG. 7, a second embodiment of the portable work bench is designated with reference numeral 10'. Like the previous embodiment, work bench 10' has a structural body 11 and a platform 12 disposed on and frictionally contacting the structural body 11. In addition, the work bench 10 may have legs 13 for supporting the structural body 11 and platform 12.

Figure 8:
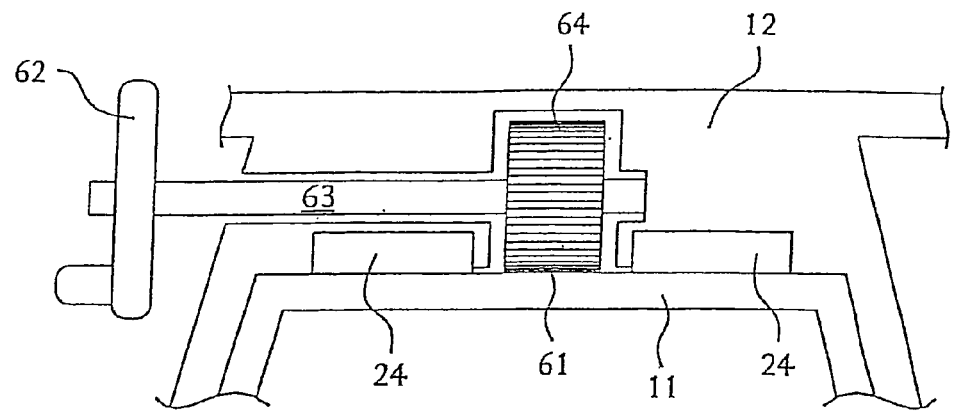
FIG. 8 is a cross-sectional side view of the work bench along line 8-8 of FIG. 7.

The platform 12 may also have an override mechanism, allowing the user to move the platform 12 along the length of the structural body 11. FIGS. 7 and 8 show different aspects of another override mechanism used to accomplish this purpose. Preferably, the structural body 11 has a rack 61 along its entire length. The platform 12, in turn, has a crank wheel 62, connected to a rod 63. Rod 63 has a pinion 64 disposed thereon. Pinion 64 meshes with the rack 61. The platform 12 may also have rollers 24 disposed thereon.

By turning the knob 50, the pinion 64 rotates, meshing with the rack 61, thus overriding the static friction between the platform 12 and the structural body 11 and moving the platform 12 along the length of the structural body 11. Persons skilled in the art may recognize that a proper ratio between the pinion and rack teeth can be selected in order to produce a mechanical advantage to help the user to move the platform 12 along the length of the structural body 11.

Persons skilled in the art should also recognize that a lock mechanism can be provided to lock the crank wheel in order to prevent unintended movement of the platform 12. Such persons will recognize that exemplary crank wheel lock mechanisms exists, for example, in the table saw field.

Figure 9:
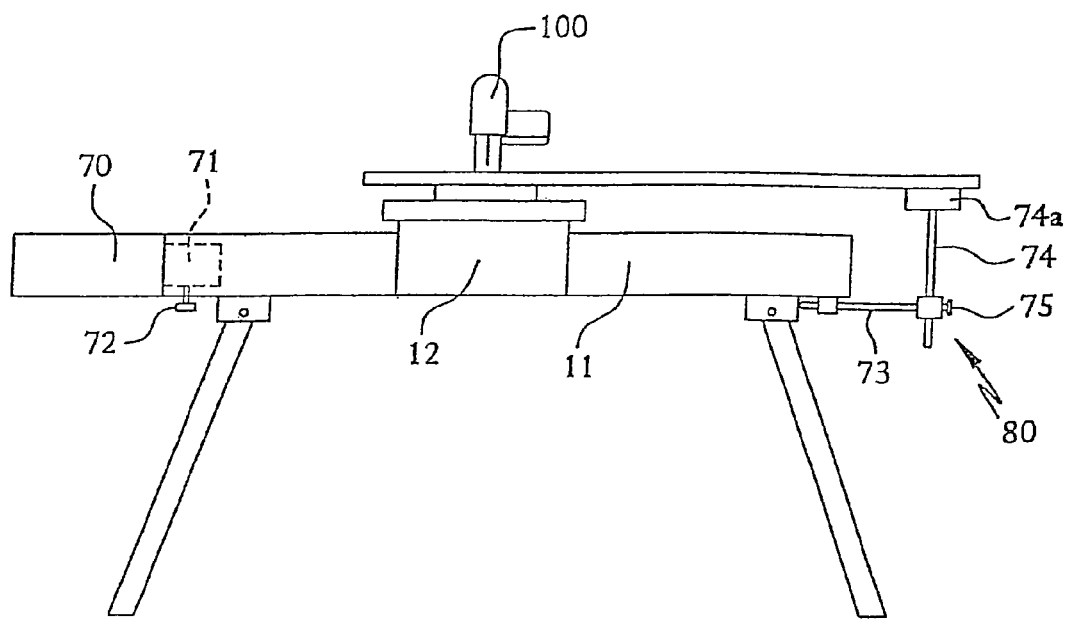
FIG. 9 is a front view of the work bench of the present invention with additional attachments and extensions.

In addition, persons skilled in the art will recognize that extensions can be added to the portable work bench as is well known in the art. Referring to FIG. 9, extension 70 can be inserted into the structural body 11 in order to increase its length, allowing the user to move the platform 12 along a greater length. Preferably, extension 70 has the same cross-section as the structural body 11. Extension 70 preferably has a fixed inner joint 71, which can be inserted into the structural body 11. The joint 71 can then be secured by means of a screw or pin assembly 72.

A workpiece support mechanism 80 can also be used on the work bench. This mechanism can support an elongated workpiece, such as moldings, etc., so that the user can cut it accurately.

The support mechanism 80 has a bar 73, which is slidably attached to the structural body 11. A clamp assembly 75 is disposed at the end of bar 73. The clamp assembly 75 slidably receives and clamps a bar 74. A support end 74a is in turn disposed at the end of bar 74. Accordingly, a user can adjust the bar 74 and support end 74a, and then adjust the bar 73 so that the workpiece is properly supported.

Figure 10:
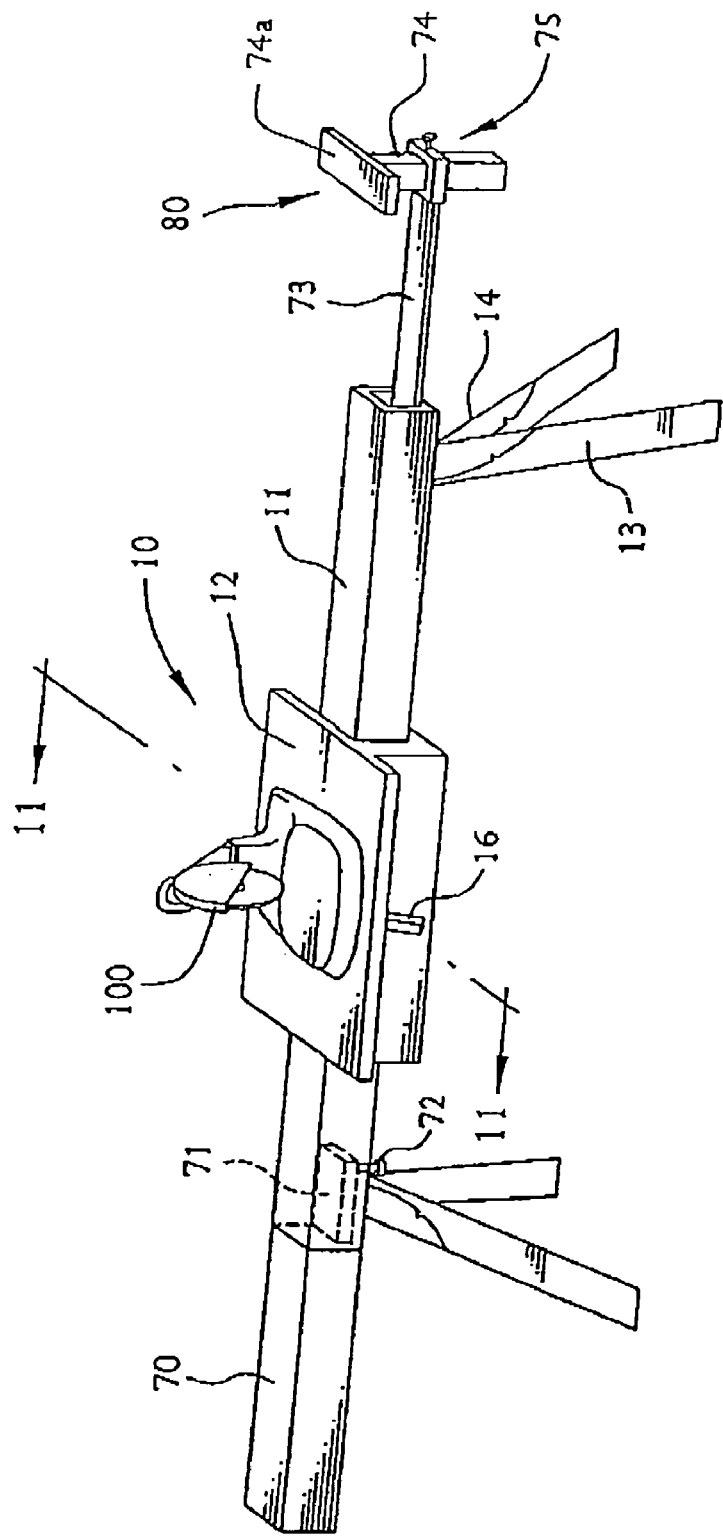
FIG. 10 is a perspective view of a portable work bench of the present invention.
Figure 11:
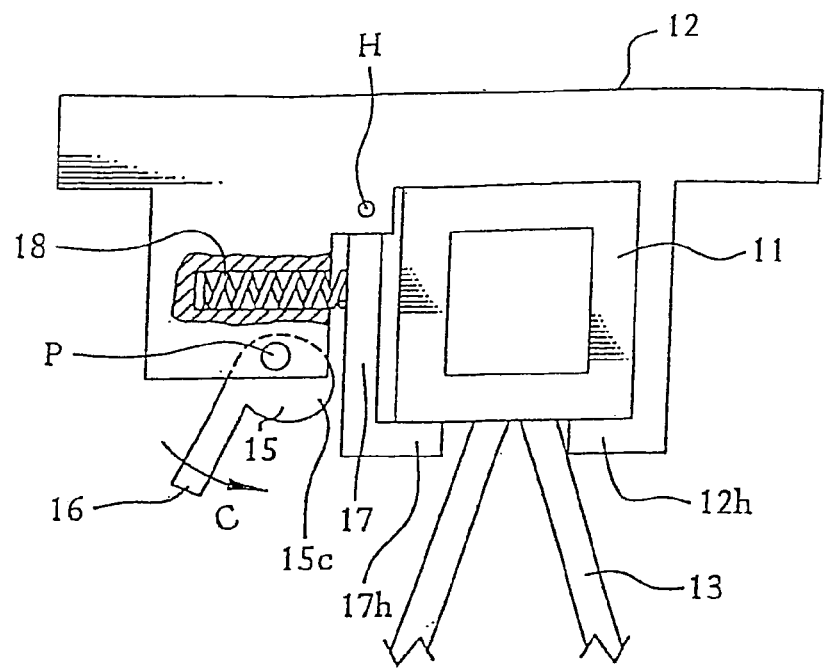
FIG. 11 is a cross-sectional side view of a first embodiment of the work bench along plane II-II-II of FIG. 10.
Figure 12:
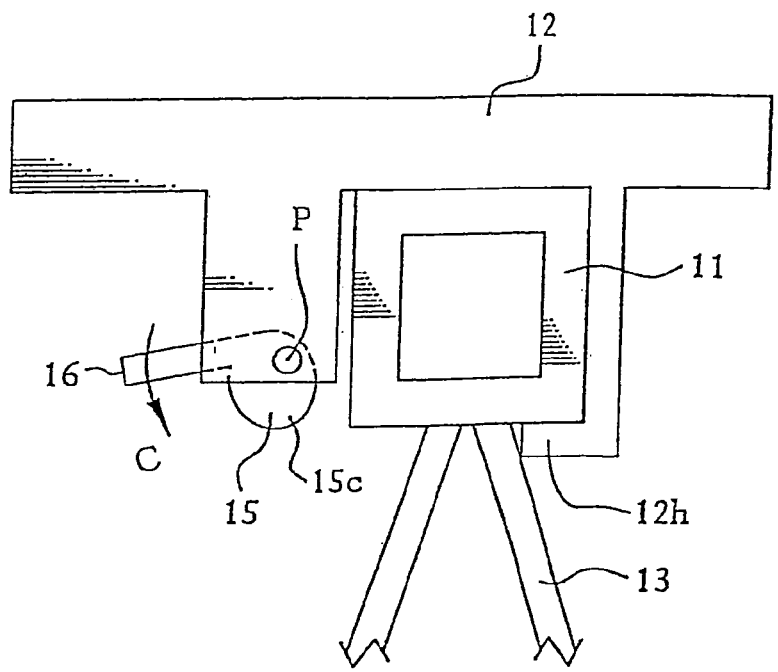
FIG. 12 is a cross-sectional side view of a second embodiment of the work bench along plane II-II-II of FIG. 10.

FIGS. 10-12 show another embodiment of the present invention, wherein like numerals designate like parts. As before, the structural body 11 is preferably tubular so that it can withstand substantial amounts of torsional and lateral loads applied thereto. Furthermore, the cross-section of the structural body 11 is preferably square.

The platform 12 is preferably designed to receive a power tool 100 thereon in the manner well known in the art. As mentioned above, the platform 12 is disposed on the structural body 11. As seen in FIG. 11, the platform 12 may contacts the top and rear surfaces of the body 11. Platform 12 may also contact the bottom surface of the body 11 via a hook portion 12h.

Platform 12 may also have a cam 15 pivotally attached thereto and pivotable about axis P. A handle 16 is connected to cam 15 so that, upon movement of handle 16, cam 15 moves.

In addition, platform 12 may have a locking plate 17 pivotally attached thereto and pivotable about axis H. Locking plate 17 may pivot between a first position contacting the structural body 11 and a second position not contacting the structural body 11. A spring 18 may be connected between locking plate 17 and platform 12 to bias locking plate 17 towards the second position.

In order to lock platform 12 on the desired position along structural body 11, the user need only move handle 16 along direction C. This will cause cam 15 to rotate and bring cam portion 15c against locking plate 17. As cam 15 is rotated, the locking plate 17 is moved further towards the first position until it contacts structural body 11. Locking plate 17 may have a hook portion 17h to further contact the structural body 11 when in the first position. To unlock platform 12, the user need only move handle 16 in the opposite direction.

Persons skilled in the art will recognize that the same result, i.e., locking platform 12 on a desired position along structural body 11, may be achieved without locking plate 17 and spring 18, as shown in FIG. 3. Instead, cam 15 will contact structural body directly.

Persons skilled in the art may recognize other additions or alternatives to the means disclosed herein. However, all these additions and/or alterations are considered to be equivalents of the present invention.

What is claimed is:

1. A portable workbench comprising:
 a structural body having a longitudinal axis and having a width and a length longer than the width;
 a plurality of legs supporting the structural body
 a platform disposed on the structural body and contacting the structural body on at least two sides; and
 a locking mechanism disposed on the platform for fixing the position of the platform relative to the structural body, said locking mechanism comprising an eccentric cam rotatable about a first axis between a first position locking the platform on the structural body and a second position unlocking the platform.

2. The work bench of claim 1, wherein the structural body is tubular.

3. The work bench of claim 1, wherein the structural body has a trapezoidal cross-section.

4. The work bench of claim 1, wherein the platform further comprises a top surface, upon which a power tool can be installed thereon.

5. The work bench of claim 1, wherein the platform further comprises side surfaces that frictionally contact the structural body.

6. The work bench of claim 5, wherein the side surfaces end in respective flat foot portions.

7. The work bench of claim 1, further comprising an extension that can be installed at an end of said structural body.

8. The work bench of claim 1, further comprising a support mechanism installed at an end of said structural body for supporting an elongated work piece.

9. The work bench of claim 1, wherein the structural body has a square cross-section.

10. The work bench of claim 1, wherein the platform is movable along the structural body.

11. The work bench of claim 1, wherein the first axis is substantially parallel to the longitudinal axis of the structural body.

12. The work bench of claim 1, wherein the platform comprises a hook portion contacting the structural body.

13. The work bench of claim 1, wherein the locking mechanism further comprises a plate disposed between the cam and the other of the structural body and the platform.

14. The work bench of claim 13, wherein the locking mechanism further comprises a spring for biasing the plate towards the cam.

15. The work bench of claim 1, further comprising a handle connected to the cam for moving the cam between first and second positions.

16. The work bench of claim 1, wherein the first axis is substantially horizontal.

* * * * *